(12) United States Patent
Huang et al.

(10) Patent No.: US 11,249,346 B2
(45) Date of Patent: Feb. 15, 2022

(54) BACKLIGHT MODULE AND DISPLAY APPARATUS THEREOF

(71) Applicant: QISDA CORPORATION, Taoyuan (TW)

(72) Inventors: Chun-Wei Huang, Taoyuan (TW); Chih-Chieh Su, Taoyuan (TW); Chung-Yu Kuo, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/114,396

(22) Filed: Dec. 7, 2020

(65) Prior Publication Data
US 2021/0215975 A1 Jul. 15, 2021

(30) Foreign Application Priority Data
Jan. 9, 2020 (CN) .......................... 202010021078.7

(51) Int. Cl.
*G02F 1/13357* (2006.01)
*F21V 8/00* (2006.01)

(52) U.S. Cl.
CPC ..... *G02F 1/133608* (2013.01); *G02B 6/0091* (2013.01); *G02F 1/133611* (2013.01)

(58) Field of Classification Search
CPC ......... G02F 1/133608; G02F 1/133611; G02F 1/133606; G02B 6/0091; G02B 6/0053; G02B 6/0086; G02B 6/0088; G02B 6/009
See application file for complete search history.

(56) References Cited

U.S. PATENT DOCUMENTS

2016/0299286 A1* 10/2016 Choi .................... G02B 6/0091
2017/0205571 A1* 7/2017 Kim ..................... G02B 6/0088

* cited by examiner

*Primary Examiner* — Donald L Raleigh

(57) ABSTRACT

A backlight module provides light to a display panel and includes a bottom board, a support frame, first and second magnetic members, a light guide device, and a light source. The support frame is connected to the bottom board to contain the light guide device. The light source is disposed on the bottom board corresponding to a light entrance surface of the light guide device. Light of the light source is incident into the light guide device via the light entrance surface and emitted to the display panel from a light exit surface of the light guide device. The first magnetic member is disposed on the support frame or the light guide device corresponding to the light source. The second magnetic member is disposed corresponding to the first magnetic member to generate a magnetic force for driving the light entrance surface to be aligned with the light source.

4 Claims, 3 Drawing Sheets

BACKLIGHT MODULE AND DISPLAY APPARATUS THEREOF

BACKGROUND OF THE INVENTION

1. Field of the Invention

The present invention relates to a backlight module and a display apparatus thereof, and more specifically, to a backlight module utilizing a magnetic force for preventing warpage of a light guide plate and a display apparatus thereof.

2. Description of the Prior Art

Since liquid crystal molecules do not produce light themselves, a conventional method for driving a liquid crystal display device to display images involves utilizing a backlight module to provide light with sufficient brightness and uniform distribution to the liquid crystal display device. Therefore, the backlight module is one of the major components of the liquid crystal display device. The related light emitting design is to fix a light guide plate to a bottom board by glue and then utilize a light emitting diode disposed at a light entrance side of the light guide plate to emit light into the light guide plate. Accordingly, the backlight module could generate a surface light source with sufficient brightness and uniform distribution via the light guide design of the light guide plate.

However, due to the thinning structural design of the light guide plate, upward warpage of the light guide plate usually occurs at the light entrance side to make the light entrance surface misaligned with the light emitting diode, so as to cause the light leakage problem and the problem that only partial light can be incident into the light guide plate. Thus, it may greatly reduce efficiency of the backlight module in use of light. Although the aforesaid warpage problem can be solved by utilizing glue to stick the bottom board to a bottom portion of the light guide plate corresponding to the light entrance side, this method may further result in a time-consuming and strenuous assembly process since the glue makes the light guide plate sticky. Moreover, the aforesaid method may also cause the problem that the glue is not sticky when heated and the hotspot problem due to light reflection and scattering at the glue.

SUMMARY OF THE INVENTION

The present invention provides a backlight module suitable for providing light to a display panel. The backlight module includes a bottom board, a support frame, a light guide device, a light source, a first magnetic member and a second magnetic member. The bottom board has a side board portion and a lower board portion. The support frame has a side frame portion and an upper frame portion. The side frame portion is connected to the side board portion for forming a containing space cooperatively with the upper frame portion, the side board portion and the lower board portion. The display panel is supported on the upper frame portion. The light guide device is disposed in the containing space. The light guide device has a light entrance surface, a light exit surface, and a bottom surface. The light exit surface is located under the display panel and opposite to the bottom surface. The light entrance surface is located between the bottom surface and the light exit surface. The light source is disposed on the side board portion and located at a side of the light guide device corresponding to the light entrance surface. Light of the light source is incident into the light guide device via the light entrance surface and emitted to the display panel from the light exit surface. The first magnetic member is disposed in the support frame or on the light guide device corresponding to the light source. The second magnetic member is disposed corresponding to the first magnetic member to generate a magnetic force. The magnetic force attracts the first magnetic member to approach the second magnetic member for driving the light entrance surface of the light guide device to be aligned with the light source.

The present invention further provides a display apparatus. The display apparatus includes a display panel and a backlight module. The backlight module is disposed under the display panel and includes a bottom board, a support frame, a light guide device, a light source, a first magnetic member and a second magnetic member. The bottom board has a side board portion and a lower board portion. The support frame has a side frame portion and an upper frame portion. The side frame portion is connected to the side board portion for forming a containing space cooperatively with the upper frame portion, the side board portion and the lower board portion. The display panel is supported on the upper frame portion. The light guide device is disposed in the containing space. The light guide device has a light entrance surface, a light exit surface, and a bottom surface. The light exit surface is located under the display panel and opposite to the bottom surface. The light entrance surface is located between the bottom surface and the light exit surface. The light source is disposed on the side board portion and located at a side of the light guide device corresponding to the light entrance surface. Light of the light source is incident into the light guide device via the light entrance surface and emitted to the display panel from the light exit surface. The first magnetic member is disposed in the support frame or on the light guide device corresponding to the light source. The second magnetic member is disposed corresponding to the first magnetic member to generate a magnetic force. The magnetic force attracts the first magnetic member to approach the second magnetic member for driving the light entrance surface of the light guide device to be aligned with the light source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
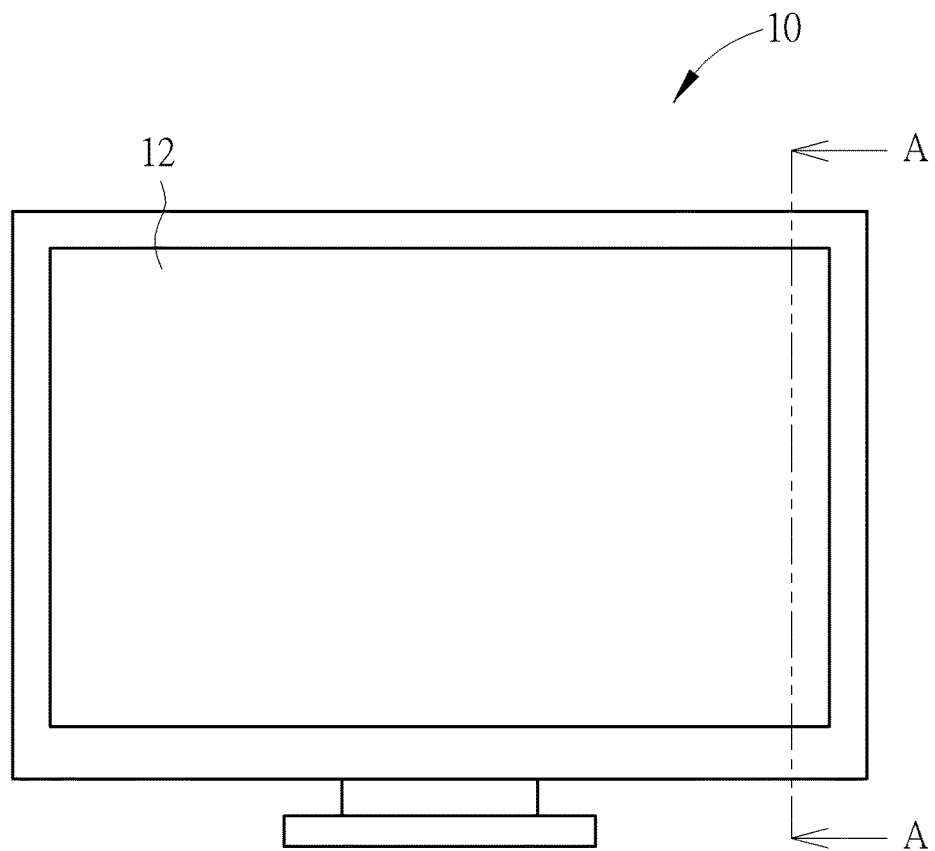
FIG. 1 is a front view of a display apparatus according to an embodiment of the present invention.
Figure 2:
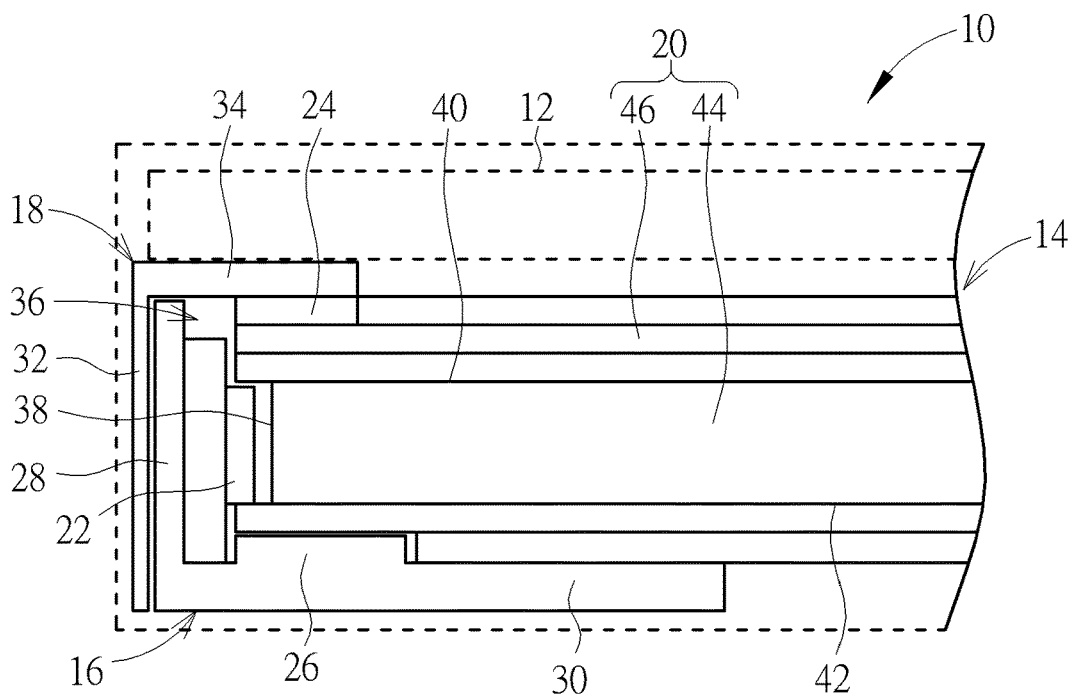
FIG. 2 is a partial cross-sectional diagram of the display apparatus in FIG. 1 along a cross-sectional line A-A.

Please refer to FIG. 1 and FIG. 2. FIG. 1 is a front view of a display apparatus 10 according to an embodiment of the present invention. FIG. 2 is a partial cross-sectional diagram of the display apparatus 10 in FIG. 1 along a cross-sectional line A-A. The display apparatus 10 could be a liquid crystal display screen, but not limited thereto, meaning that the display apparatus 10 could be other display device, such as a liquid crystal display TV. As shown in FIG. 1 and FIG. 2, the display apparatus 10 includes a display panel 12 and a backlight module 14. For clearly showing the design of the backlight module 14, the display panel 12 and the other related components (e.g. a side frame) of the display apparatus 10 besides the display panel 12 and the backlight module 14 are briefly depicted by dashed lines in FIG. 2. The backlight module 14 is disposed under the display panel for providing light with sufficient brightness and uniform distribution to the display panel 12.

More detailed description for the backlight module 14 is provided as follows. As shown in FIG. 2, the backlight module 14 includes a bottom board 16, a support frame 18, a light guide device 20, a light source 22, a first magnetic member 24, and a second magnetic member 26. The bottom board 16 has a side board portion 28 and a lower board portion 30, and the support frame 18 has a side frame portion 32 and an upper frame portion 34. Accordingly, the side frame portion 32 can be connected to the side board portion 28 for forming a containing space 36 cooperatively with the upper frame portion 34, the side board portion 28 and the lower board portion 30, and the display panel 12 can be supported on the upper frame portion 34 of the support frame 18.

The light guide device 20 is disposed in the containing space 36 and has a light entrance surface 38, a light exit surface 40, and a bottom surface 42. The light exit surface 40 is located under the display panel 12 and opposite to the bottom surface 42, and the light entrance surface 38 is located between the light exit surface 40 and the bottom surface 42. To be more specific, in this embodiment, the light guide device 20 includes a light guide plate 44 and a brightness enhancement device 46. The light guide plate 44 has the light entrance surface 38, the light exit surface 40, and the bottom surface 42 and is disposed on the lower board portion 30 of the bottom board 16. The brightness enhancement device 46 could include conventional brightness enhancement components, such as a diffuser and a brightness enhancement film, and the related description is commonly seen in the prior art and omitted herein. The brightness enhancement device 46 is disposed on the light exit surface 40 for enhancing brightness of light emitted from the light exit surface 40. The light source 22 could be preferably a light emitting diode (but not limited thereto). The light source 22 is disposed on the side board portion 28 and located at a side of the light guide plate 44 corresponding to the light entrance surface 38. In such a manner, light emitted by the light source 22 can be incident into the light guide plate 44 via the light entrance surface 38 and emitted out of the light exit surface 40, so as to provide light with sufficient brightness and uniform distribution to the display panel 12.

As shown in FIG. 2, the first magnetic member 24 is disposed in the support frame 18 corresponding to the light source 22, and the second magnetic member 26 is disposed corresponding to the first magnetic member 24 to generate a magnetic force cooperatively with the first magnetic member 24. To be more specific, in this embodiment, the first magnetic member 24 is disposed on the upper frame portion 34 corresponding to the light source 22 and the light exit surface 40, and the second magnetic member 26 is disposed on the lower board portion 30 and is opposite to the first magnetic member 24. The first magnetic member 24 could be preferably a magnet. The second magnetic member 26 could be preferably made of magnetic material (e.g. iron or other metal material) and integrally formed with the lower board portion 30 (but not limited thereto, meaning that the present invention could adopt the design that the second magnetic member 26 is a magnet and the first magnetic member 24 is made of magnetic material).

Via the aforesaid designs, the magnetic force between the first magnetic member 24 and the second magnetic member 26 can attract the first magnetic member 24 to approach the second magnetic member 26 to drive the upper frame portion 34 to press the brightness enhancement device 46 via the first magnetic member 24, so as to make the upper frame portion 34 and the lower board portion 30 clamp the light guide device 20 cooperatively (as shown in FIG. 2). That is, the upper frame portion 34 and the lower board portion 30 can cooperatively clamp a side of the light guide plate 44 corresponding to the light entrance surface 38 for preventing warpage of the light guide plate 44, so that the light entrance surface 38 of the light guide plate 44 can be aligned with the light source 22 precisely.

In summary, via the magnetic attraction design that the magnetic force between the first magnetic member and the second magnetic member is utilized to drive the support frame and the bottom board to clamp the light guide device, the present invention can efficiently solve the prior art problem that upward warpage of the light guide plate misaligns the light entrance surface with the light emitting diode to reduce efficiency of the backlight module in use of light. Furthermore, since there is no need to stick the bottom board to the light guide plate by glue for preventing warpage of the light guide plate, the present invention can also solve the problem that the glue sticking method results in a time-consuming and strenuous assembly process of the backlight module, the problem that the glue is not sticky when heated, and the hotspot problem due to light reflection and scattering at the glue. As such, the present invention can greatly simplify the assembly process of the backlight module and improve the image display quality of the display apparatus.

Figure 3:
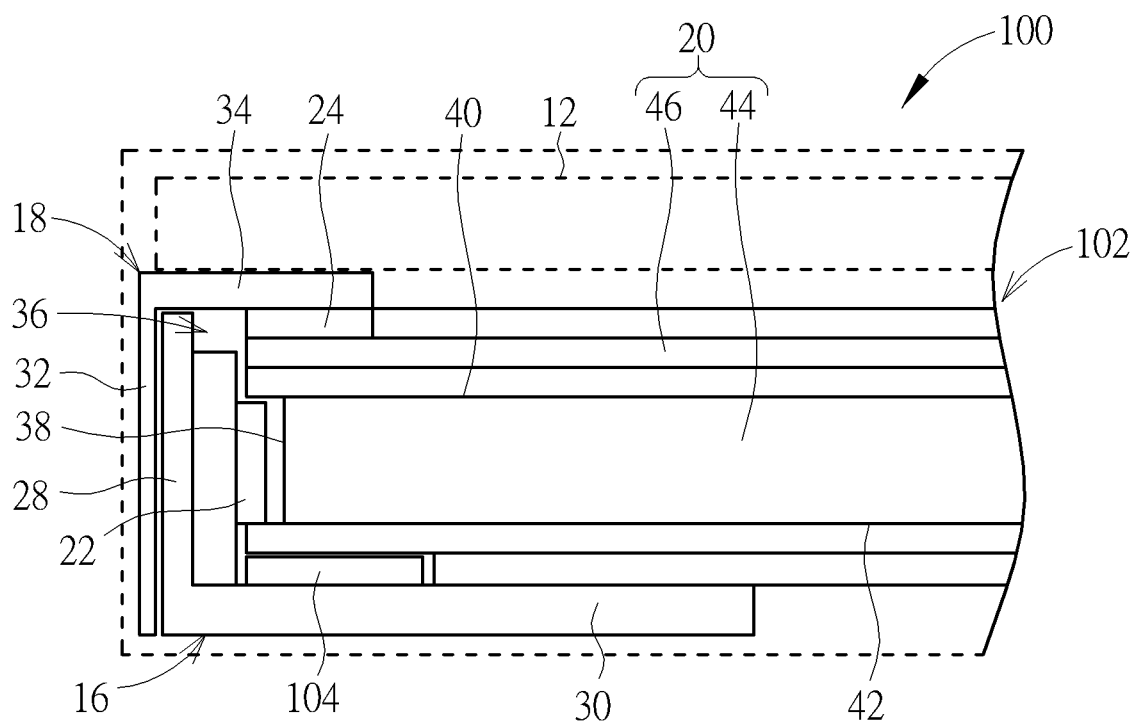
FIG. 3 is a partial cross-sectional diagram of a display apparatus according to another embodiment of the present invention.

It should be mentioned that configuration of the first magnetic member and the second magnetic member is not limited to the aforesaid embodiments. That is, all the warpage preventing designs in which the light guide device is clamped by the magnetic force between the first magnetic member and the second magnetic member for aligning the light entrance surface of the light guide device with the light source may fall within the scope of the present invention. For example, please refer to FIG. 3, which is a partial cross-sectional diagram of a display apparatus 100 according to another embodiment of the present invention. Components both mentioned in this embodiment and the aforesaid embodiments represent components with similar structures or functions, and the related description is omitted herein. As shown in FIG. 3, the display apparatus 100 includes the display panel 12 and a backlight module 102. The backlight module 102 is disposed under the display panel 12 and includes the bottom board 16, the support frame 18, the light guide device 20, the light source 22, the first magnetic member 24, and a second magnetic member 104. In this embodiment, the second magnetic member 104 is a magnet and is disposed on the lower board portion 30 and opposite to the first magnetic member 24. Accordingly, the magnetic force between the first magnetic member 24 and the second magnetic member 104 can attract the first magnetic member 24 to approach the second magnetic member 104 to drive the upper frame portion 34 and the lower board portion 30 for clamping the light guide device 20 cooperatively, so as to efficiently prevent warpage of the light guide plate 44.

Figure 4:
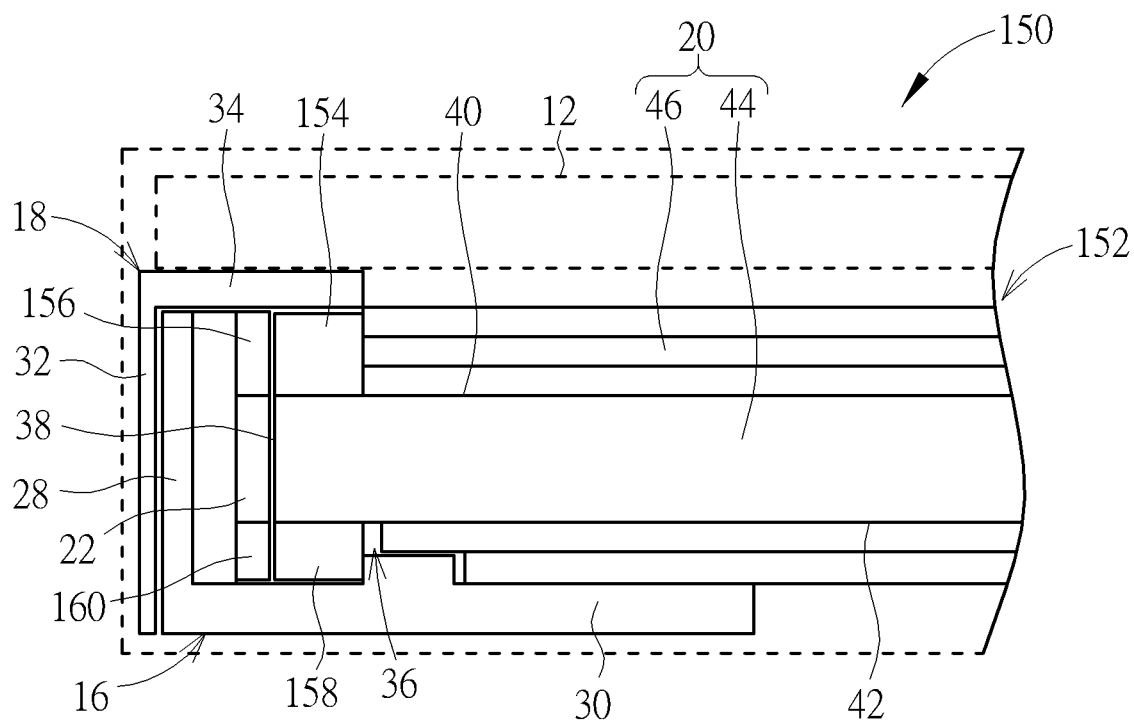
FIG. 4 is a partial cross-sectional diagram of a display apparatus according to another embodiment of the present invention.

In another embodiment, please refer to FIG. 4, which is a partial cross-sectional diagram of a display apparatus 150 according to another embodiment of the present invention. Components both mentioned in this embodiment and the aforesaid embodiments represent components with similar structures or functions, and the related description is omitted herein. As shown in FIG. 4, the display apparatus 150 includes the display panel 12 and a backlight module 152. The backlight module 152 is disposed under the display panel 12 and includes the bottom board 16, the support frame 18, the light guide device 20, the light source 22, a first magnetic member 154, a second magnetic member 156, a third magnetic member 158, and a fourth magnetic member 160. In this embodiment, the first magnetic member 154 is disposed on the light exit surface 40 of the light guide plate 44, the second magnetic member 156 is disposed on the light source 22 and opposite to the first magnetic member 154, the third magnetic member 158 is disposed on the bottom surface 42 of the light guide plate 44, and the fourth magnetic member 160 is disposed on the light source 22 and opposite to the third magnetic member 158. Accordingly, the magnetic force between the first magnetic member 154 and the second magnetic member 156 can attract the first magnetic member 154 to contact with the second magnetic member 156, and the magnetic force between the third magnetic member 158 and the fourth magnetic member 160 can attract the third magnetic member 158 to contact with the fourth magnetic member 160, so as to drive the light entrance surface 38 of the light guide plate 44 to be aligned with the light source 22 for preventing warpage of the light guide plate 44.

To be noted, in practical application, one of the first magnetic member 154 and the second magnetic member 156 could be a magnet, and the other of the first magnetic member 154 and the second magnetic member 156 could be a magnet or made of magnetic material (e.g. iron or other metal material). As for the related description for the magnetic designs of the third magnetic member 158 and the fourth magnetic member 160, it could be reasoned by analogy and omitted herein.

The present invention is not limited to the two-sided magnetic contact design mentioned in the aforesaid embodiments. That is, the present invention could adopt the one-sided magnetic contact design for simplifying the structural design of the backlight module in another embodiment. In brief, in the embodiment omitting the third magnetic member and the fourth magnetic member, the first magnetic member could be disposed on the bottom surface of the light guide plate and the second magnetic member could be disposed on the light source and opposite to the first magnetic member, or the first magnetic member could be disposed on the light exit surface of the light guide plate and the second magnetic member could be disposed on the light source and opposite to the first magnetic member. Accordingly, the magnetic force between the first magnetic member and the second magnetic member can attract the first magnetic member to contact with the second magnetic member for driving the light entrance surface of the light guide plate to be aligned with the light source.

Figure 5:
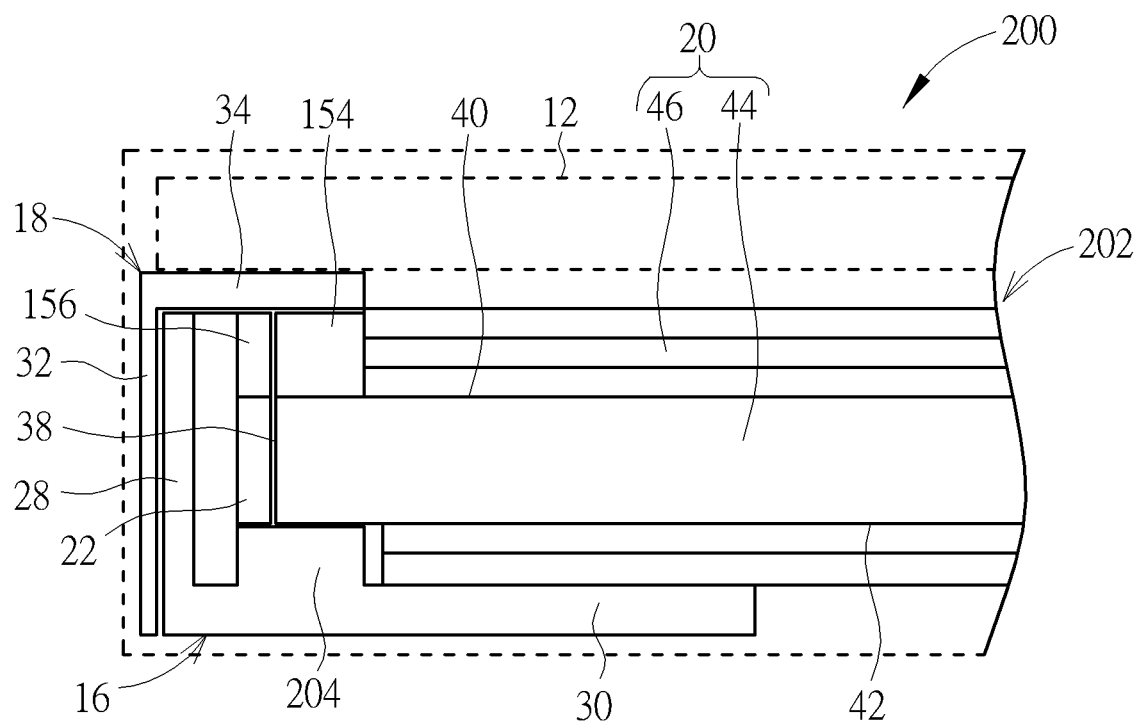
FIG. 5 is a partial cross-sectional diagram of a display apparatus according to another embodiment of the present invention.

Moreover, the present invention could simultaneously adopt the magnetic contact design and the magnetic attraction design in another embodiment. For example, please refer to FIG. 5, which is a partial cross-sectional diagram of a display apparatus 200 according to another embodiment of the present invention. Components both mentioned in this embodiment and the aforesaid embodiments represent components with similar structures or functions, and the related description is omitted herein. As shown in FIG. 5, the display apparatus 200 includes the display panel 12 and a backlight module 202. The backlight module 202 is disposed under the display panel 12 and includes the bottom board 16, the support frame 18, the light guide device 20, the light source 22, the first magnetic member 154, the second magnetic member 156, and a second magnetic member 204. In this embodiment, the second magnetic member 204 could be preferably made of magnetic material (e.g. iron or other metal material) and integrally formed with the lower board portion 30 of the bottom board 16 (but not limited thereto, meaning that the present invention could adopt the design that the second magnetic member 204 is a magnet). Accordingly, the magnetic force between the first magnetic member 154 and the second magnetic member 156 can attract the first magnetic member 154 to contact with the second magnetic member 156, and the magnetic force between the first magnetic member 154 and the second magnetic member 204 can attract the first magnetic member 154 to approach the second magnetic member 204, so as to drive the upper frame portion 34 and the lower board portion 30 to clamp the light guide plate 44. As such, the light entrance surface 38 of the light guide plate 44 can be driven to be aligned with the light source 22 for preventing warpage of the light guide plate 44.

Figure 6:
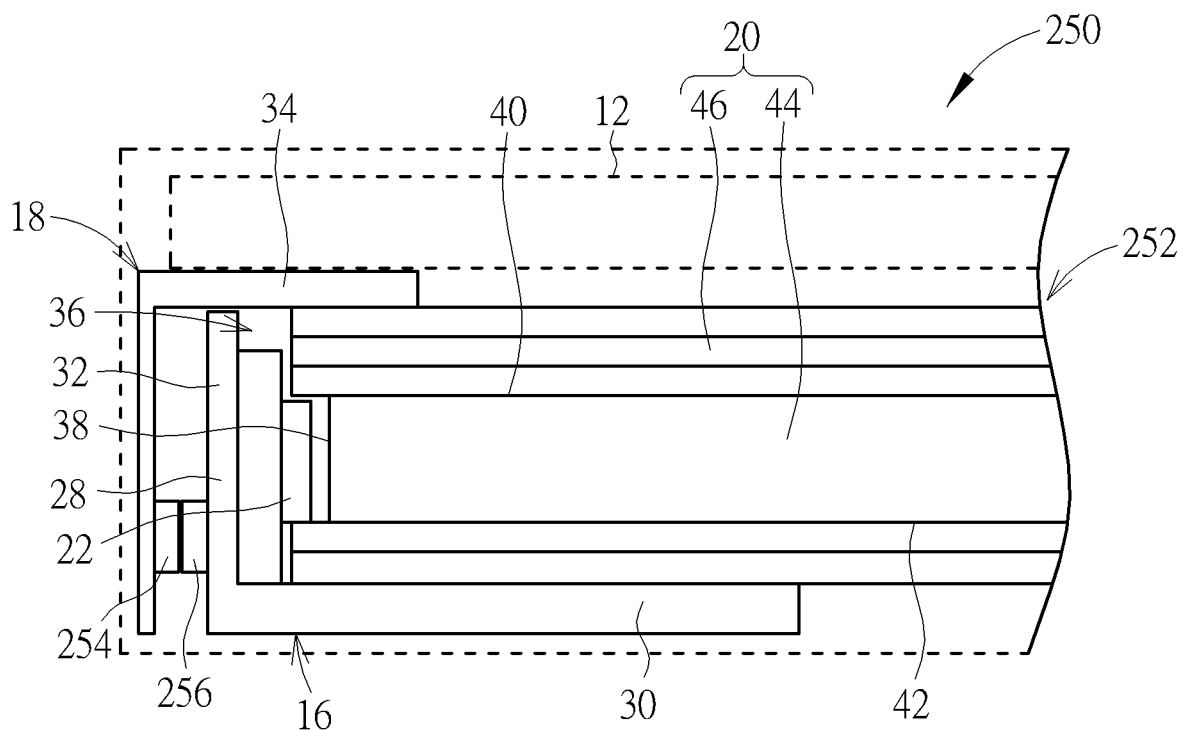
FIG. 6 is a partial cross-sectional diagram of a display apparatus according to another embodiment of the present invention.

In addition, the present invention could adopt the design that the magnetic members are disposed on the side portions of the support frame and the bottom board respectively. For example, please refer to FIG. 6, which is a partial cross-sectional diagram of a display apparatus 250 according to another embodiment of the present invention. Components both mentioned in this embodiment and the aforesaid embodiments represent components with similar structures or functions, and the related description is omitted herein. As shown in FIG. 6, the display apparatus 250 includes the display panel 12 and a backlight module 252. The backlight module 252 is disposed under the display panel 12 and includes the bottom board 16, the support frame 18, the light guide device 20, the light source 22, a first magnetic member 254, and a second magnetic member 256. In this embodiment, the first magnetic member 254 is disposed on the side frame portion 32 of the support frame 18 corresponding to the light source 22, and the second magnetic member 256 is disposed on the side board portion 28 of the bottom board 16 and opposite to the first magnetic member 254. Accordingly, the magnetic force between the first magnetic member 254 and the second magnetic member 256 can attract the first magnetic member 254 to contact with the second magnetic member 256, so as to connect the side frame portion 32 to the side board portion 28. Connection between the side frame portion 32 and the side board portion 28 can drive the upper frame portion 34 of the support frame 18 and the lower board portion 30 of the bottom board 16 to cooperatively clamp the light guide device 20, so as to efficiently prevent warpage of the light guide plate 44. As for the related description for the magnetic designs of the first magnetic member 254 and the second magnetic member 256, it could be reasoned by analogy according to the aforesaid embodiments and omitted herein.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A backlight module suitable for providing light to a display panel, the backlight module comprising:
   a bottom board having a side board portion and a lower board portion;
   a support frame having a side frame portion and an upper frame portion, the side frame portion being connected to the side board portion for forming a containing space cooperatively with the upper frame portion, the side board portion and the lower board portion, the display panel being supported on the upper frame portion;
   a light guide device disposed in the containing space, the light guide device having a light entrance surface, a light exit surface, and a bottom surface, the light exit surface being located under the display panel and opposite to the bottom surface, the light entrance surface being located between the bottom surface and the light exit surface;
   a light source disposed on the side board portion and located at a side of the light guide device corresponding to the light entrance surface, light of the light source being incident into the light guide device via the light entrance surface and emitted to the display panel from the light exit surface;
   a first magnetic member disposed on the upper frame portion corresponding to the light source and the light exit surface; and
   a second magnetic member disposed on the lower board portion and opposite to the first magnetic member to generate a magnetic force, the magnetic force driving the upper frame portion to press the light guide device via the first magnetic member for clamping the light guide device cooperatively with the lower board portion to make the light entrance surface aligned with the light source, wherein the first magnetic member and the second magnetic member are magnets.

2. The backlight module of claim 1, wherein the light guide device comprises a light guide plate and a brightness enhancement device, the light guide plate has the light entrance surface, the light exit surface and the bottom surface and is disposed on the lower board portion, the brightness enhancement device is disposed on the light exit surface to enhance brightness of light emitted from the light exit surface, and the magnetic force drives the upper frame portion to press the brightness enhancement device via the first magnetic member for clamping the light guide device cooperatively with the lower board portion.

3. A display apparatus comprising:
   a display panel; and
   a backlight module disposed under the display panel, the backlight module comprising:
   a bottom board having a side board portion and a lower board portion;
   a support frame having a side frame portion and an upper frame portion, the side frame portion being connected to the side board portion for forming a containing space cooperatively with the upper frame portion, the side board portion and the lower board portion, the display panel being supported on the upper frame portion;
   a light guide device disposed in the containing space, the light guide device having a light entrance surface, a light exit surface, and a bottom surface, the light exit surface being located under the display panel and opposite to the bottom surface, the light entrance surface being located between the bottom surface and the light exit surface;
   a light source disposed on the side board portion and located at a side of the light guide device corresponding to the light entrance surface, light of the light source being incident into the light guide device via the light entrance surface and emitted to the display panel from the light exit surface;
   a first magnetic member disposed on the upper frame portion corresponding to the light source and the light exit surface; and
   a second magnetic member disposed on the lower board portion and opposite to the first magnetic member to generate a magnetic force, the magnetic force driving the upper frame portion to press the light guide device via the first magnetic member for clamping the light guide device cooperatively with the lower board portion to make the light entrance surface aligned with the light source, wherein the first magnetic member and the second magnetic member are magnets.

4. The display apparatus of claim 3, wherein the light guide device comprises a light guide plate and a brightness enhancement device, the light guide plate has the light entrance surface, the light exit surface and the bottom surface and is disposed on the lower board portion, the brightness enhancement device is disposed on the light exit surface to enhance brightness of light emitted from the light exit surface, and the magnetic force drives the upper frame portion to press the brightness enhancement device via the first magnetic member for clamping the light guide device cooperatively with the lower board portion.

* * * * *